April 2, 1957 R. L. KRETSCHMAR 2,787,349
METAL BUILDING ELEMENT
Filed Aug. 5, 1954
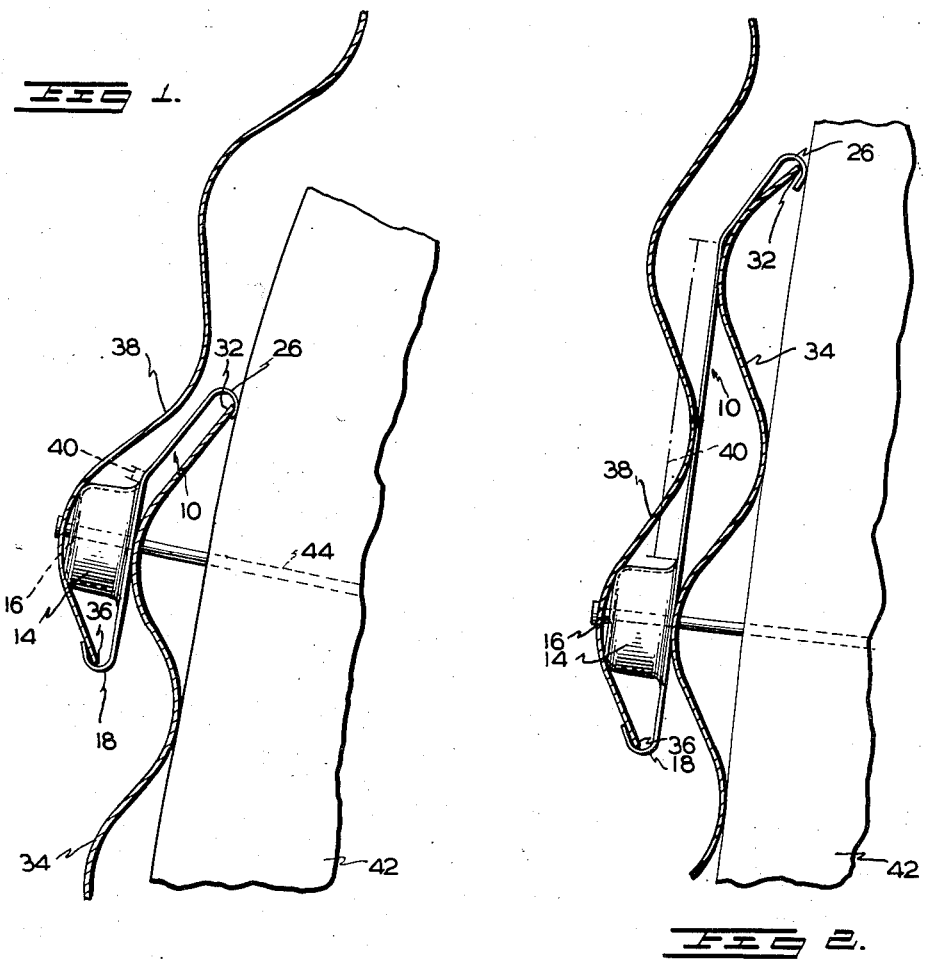
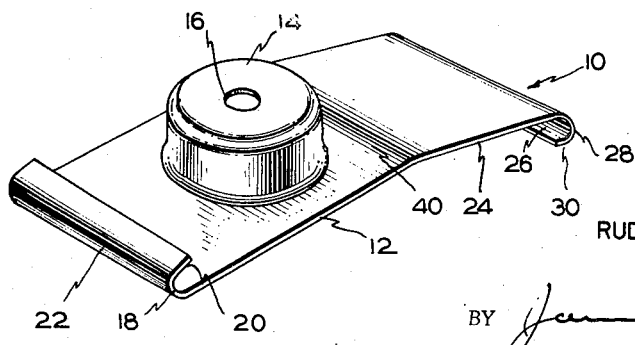
INVENTOR
RUDOLPH L. KRETSCHMAR
BY
ATTORNEY

United States Patent Office 2,787,349
Patented Apr. 2, 1957

2,787,349

METAL BUILDING ELEMENT

Rudolph L. Kretschmar, Grosse Pointe Farms, Mich., assignor to National Steel Corporation, a corporation of Delaware Application August 5, 1954, Serial No. 448,111

4 Claims. (Cl. 189—88)

This invention relates to an improved metal building element for supporting an outer corrugated sheet of structural material in generally matched overlapping relation with an inner similar corrugated sheet with the overlapped portions spaced from one another.

For the purpose of storing grain in shelters or building structures, it is customary to provide an overlapped type sheathing with the overlapped portions spaced from one another to permit aeration of the grain and at the same time protect the grain from varying conditions of weather and atmosphere. For this purpose it has been proposed to use a sheathing of corrugated sheets of structural material which are arranged in a generally matched overlapping relation with each other with the overlapped portions spaced from one another, the line of overlap being in a horizontal plane and the corrugation of each sheet extending in a horizontal direction. In order to space the overlapped portions of two corrugated sheets from each other it has been customary to field drill both sheets of the overlapped portions and then to insert a screw or nail through the drilled holes with a spacing member between the overlapped corrugations. The end of the screw or nail is held by supporting frame work or studding beneath the sheathing. This method of forming the spacing between overlapped corrugated sheets has several difficulties. The most serious difficulty is the fact that the outer corrugated sheet must be accurately positioned with respect to its adjacent corrugated sheet and held there both while field drilling the holes and while inserting the screw or nail and the spacing member. This requires the use of slings or other supporting arrangements if the installation is to be accurately made. This in turn is time consuming which causes a considerable increase in the cost of labor for erecting the structure.

It is a principal object of the present invention to provide a metal building element for erecting shelters or structures of the type employing a sheathing of corrugated structural material which is arranged in general matched overlapping relation with an inner similar corrugated sheet with the overlapped portions spaced from one another, the line of overlap being in a horizontal plane and the corrugations of each sheet extending in a horizontal direction.

A further object of the present invention is to provide a metal building element of the aforesaid type which will precisely determine the length of overlap and cause the overlapped corrugations to be maintained in a generally matched relation both during and subsequent to installation without the requirement of slings or other devices for holding the corrugated sheets in proper relation during installation.

A further object of the present invention is to provide a metal building element of the aforesaid type which is of sufficient strength or rigidity for performing its function of retaining the corrugated sheet in properly overlapped and spaced relation during the installation of the sheathing on the building and at the same time will provide a permanent means for supporting the sheathing.

Still another object of the present invention is to provide a metal building element of the aforesaid type which will properly determine the spacing between overlapped corrugated sheets and afford rigidity to the corrugated sheets along the length of their span between the structural supporting frame work members or studding of the shelter.

These and other objects of the present invention will become more apparent from the following description and accompanying drawings wherein:

Figure 1 is a cross-sectional view of two sheets of overlapped corrugated sheathing with a metal building element of the present invention supporting the sheathing in overlapped spaced relation;

Figure 2 is a view similar to Figure 1 showing a modified form of the building element of the present invention adapted to permit a greater length of overlap than that illustrated in Figure 2; and Figure 3 is a perspective view of a metal building element of the present invention.

As shown in the drawings, the metal building element 10 of the present invention includes a relatively flat body member 12 having a protuberance 14 extending from one side at a point intermediate the ends of the flat body member 12. The protuberance 14 is preferably of cup-shaped configuration which may be produced by drawing the metal of flat body member 12 or may be formed as a separate element and fixed to the body member 12 as by welding. As will be explained more clearly hereinafter a nail receiving opening 16 is provided in the end of protuberance 14 for those building elements 10 which are to be attached to studding or other supporting structure for the sheathing.

An extension 18 of the lower end of the body member 12 extends outwardly from the side on which the protuberance 14 is located and the free end 20 thereof extends upwardly to form a supporting hook 22. An outwardly and upwardly extending opposite end 24 is arranged at an obtuse angle to the side opposite to that on which protuberance 14 is located. Outwardly and upwardly extending end 24 terminates in a hook portion 26 extending outwardly at 28 and downwardly at 30.

As shown in Figures 1 and 2 of the drawings, the hook 26 of the building element 10 is placed over the upper edge 32 of the inner overlapped corrugated sheet 34 while the hook 18 receives the lower edge 36 of the outer overlapping corrugated sheet 38, it being assumed that corrugated member 34 has previously been installed and supported at its lower edge by similar metal building elements. As also shown in Figures 1 and 2, the length of overlap between corrugated sheet members 34 and 38 is determined by the dimension 40 of the metal building element 10. Thus in Figure 1 this dimension is such that the length of overlap corresponds substantially to the width of one corrugation while in Figure 2 the length of overlap corresponds to approximately twice the width of a single corrugation. The distance between inner corrugated sheet member 34 and outer corrugated sheet member 38 in the area of overlap is determined at least in part by the height of protuberance 14.

The studding 42 which supports the overlapped corrugated sheathing members is arranged in substantially vertical planes and receives a nail 44 which is driven through outer sheathing 38, opening or hole 16 of protuberance 14, and inner sheathing 32. The studding 42 may be of wood or may be of metal. Preferably it is of the nailable I-beam type which has a nail bending and gripping means therein. The preferred means of supporting the overlapped sheathing employs a metal building element 10 for each of the vertically arranged stud members 42 and one or more metal building elements 10 between adjacent vertically arranged stud members 42.

These latter metal building elements afford rigidity to the structure and evenness of spacing between overlapped corrugated sheets 34 and 38, no nailing opening 16 being required for this purpose.

The foregoing description of the present invention is for the purpose of illustration and is not limiting to the scope thereof which is set forth in the claims.

I claim:

1. A building element for supporting an outer sheet of material in generally overlapping spaced relation with an inner sheet of material, the sheets including regularly spaced alternate raised portions and depressions and the outer sheet including a terminating edge lying along a region of a depression, the building element comprising an elongated body member, a protuberance extending from one side of the body member, one end of the body member including a portion extending outwardly from the one side of the body member and then in a direction generally toward the protuberance in overlying spaced relation with the one side of the body member to form a first hook located on one side of the body member and having an opening facing in a direction generally toward the protuberance, the other end of the body member including a portion extending outwardly from the other side of the body member and then in a direction generally toward the one end of the body member in overlying spaced relation with the other side of the body member to form a second hook located on the other side of the body member and having an opening facing in a direction generally toward the one end of the body member, the second hook adapted to hook over the upper edge of the inner sheet and the first hook adapted to supportably receive the terminating edge of the outer sheet, the distance between the center of the protuberance and the first hook corresponding substantially to the transverse distance between the terminating edge and the adjacent raised portion of the outer sheet.

2. A building element for supporting an outer sheet of material in generally overlapping spaced relation with an inner sheet of material, the sheets including regularly spaced alternate raised portions and depressions and the outer sheet having a terminting edge lying along a region of a depression, the building element comprising an elongated body member, a protuberance extending from one side of the body member, one end of the body member including a portion extending outwardly from one side of the body member and then in a direction generally toward the protuberance in overlying spaced relation with the one side of the body member to form a first hook located on the one side of the body member and having an opening facing in a direction generally toward the protuberance, the other end of the body member including a portion extending outwardly from the other side of the body member and then in a direction generally toward the one end of the body member in overlying spaced relation with the other side of the body member to form a second hook located on the other side of the body member and having an opening facing in a direction generally toward the one end of the body member, the second hook adapted to hook over the upper edge of the inner sheet and the first hook adapted to supportably receive the terminating edge of the outer sheet, the distance between the center of the protuberance and the first hook corresponding substantially to the transverse distance between the terminating edge and the adjacent raised portion of the outer sheet, the protuberance having a closed end spaced from the one side of the body member and a nail receiving opening in the closed end.

3. A metal building element for supporting an outer sheet of material in generally overlapping spaced relation with an inner sheet of material, the sheets including regularly spaced alternate raised portions and depressions and the outer sheet including a terminating edge lying along a region of a depression, the building element comprising a substantially flat body member, means forming a protuberance extending from one side of the body member, one end of the body member including a portion extending outwardly from the one side of the body member and then in a direction generally toward the protuberance in overlying spaced relation with the one side of the body member to form a first hook located on the one side of the body member and having an opening facing in a direction generally toward the protuberance, an extension joined to the other end of the body member at an obtuse angle with the other side of the body member, the extension including a portion extending outwardly from its side corresponding to the other side of the body member and then in a direction generally toward the one end of the body member in overlying spaced relation with the extension to form a second hook located on the other side of the body member and having an opening facing in a direction generally toward the one end of the body member, the second hook adapted to hook over the upper edge of the inner sheet to support the building element on the inner sheet and the first hook adapted to receive the terminating edge of the outer sheet, the distance between the center of the protuberance and the first hook corresponding substantially to the transverse distance between the terminating edge and the adjacent raised portion of the outer sheet.

4. A metal building element for supporting an outer sheet of material in generally overlapping spaced relation with an inner sheet of material, the sheets including regularly spaced alternate raised portions and depressions and each of the sheets having a terminating edge lying along a region of a depression, the building element comprising a substantially flat body member, means forming a protuberance extending from one side of the body member, one end of the body member including a portion extending outwardly from the one side of the body member and then in a direction generally toward the protuberance in overlying spaced relation with the one side of the body member to form a first hook located on the one side of the body member and having an opening facing in a direction generally toward the protuberance, an extension joined to the other end of the body member at an obtuse angle with the other side of the body member, the extension including a portion extending outwardly from its side corresponding to the other side of the body member and then in a direction generally toward the one end of the body member in overlying spaced relation with the extension to form a second hook located on the other side of the body member and having an opening facing in a direction generally toward the one end of the body member, the second hook adapted to hook over the terminating edge of the inner sheet to support the building element on the inner sheet and the first hook adapted to receive the terminating edge of the outer sheet, the distance between the center of the protuberance and the first hook corresponding substantially to the transverse distance between the terminating edge and the adjacent raised portion of the outer sheet, and the distance between the center of the protuberance and the second hook corresponding substantially to the transverse distance between the terminating edge and a raised portion of the inner sheet.

References Cited in the file of this patent

UNITED STATES PATENTS

| 358,405 | Niehans | Feb. 22, 1887 |
|---|---|---|
| 1,675,201 | Voight | June 26, 1928 |
| 2,325,124 | Gardner | July 27, 1943 |

FOREIGN PATENTS

| 630,166 | France | Aug. 13, 1927 |